Aug. 21, 1934.   C. WHITMAN   1,971,147
ELECTROLUMINESCENT TUBE
Original Filed April 28, 1928
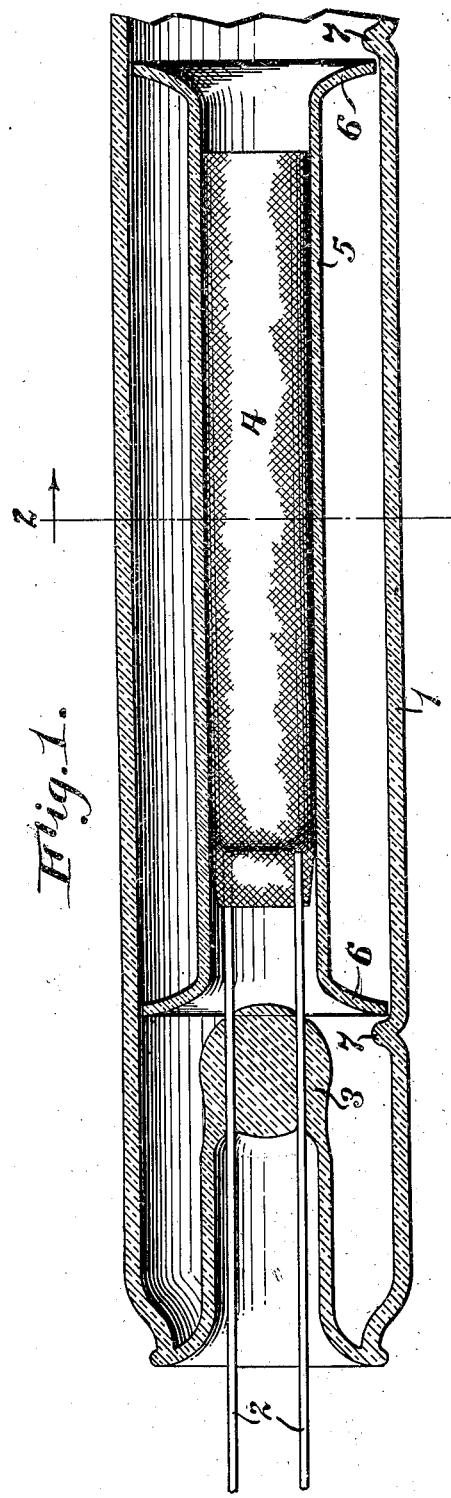
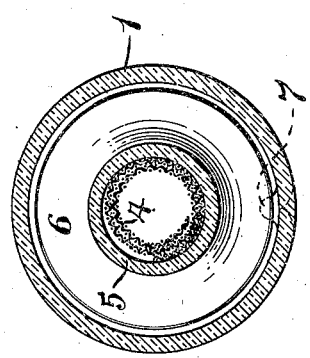
Inventor
Channing Whitman
By Popp and Powers.
Attorney Patented Aug. 21, 1934

1,971,147

UNITED STATES PATENT OFFICE 1,971,147

ELECTROLUMINESCENT TUBE

Channing Whitman, Buffalo, N. Y., assignor to Flexlume Corporation, Tonawanda, N. Y., a corporation of New York Continuation of application Serial No. 273,568, April 28, 1928. This application August 29, 1928, Serial No. 302,799½

2 Claims. (Cl. 176—126)

This application is a continuation of my application, Serial No. 273,568, filed April 28, 1928.

This invention relates to improvements in electroluminescent tubes which employ an inert gas as the luminescent medium and more particularly to the electrode construction of such tubes.

The principal object of the invention is to provide for increasing in substantial measure both the life and the operating efficiency of such a tube.

A further object is to provide for the use of a smaller quantity of gas as the luminescent medium, with resultant advantages in decreasing the production cost of the tube and enabling lower operating voltages.

A further object is so to reduce or minimize electrostatic stresses in the walls of the electrode carrying portions that there is no liability of the puncturing of such walls due to the current jumping from one tube to an adjacent tube or to an outlying conductor.

With the above objects in view the invention proposes an electrode structure which has the following operating characteristics: which prevents the occlusion by the volatilized and deposited metal of the electrode of the inert gas employed as the luminescent medium; in which the volatilized and deposited metal of the electrode may be included in and hence form part of the operating circuit; in which such metal is not deposited in any substantial degree directly on the tube walls as in the construction heretofore known; and in which impurities composed of diatomic gases, particularly including those originally occluded in the electrode, are permanently retained in the electrode structure by some action apparently not involving ordinary physical absorption or adsorption and which is effective to prevent them from masking the spectrum of the inert gas in the display or so-called capillary portion of the tube. This action at present is not fully understood but in any event eliminates the feature, necessary in the prior constructions, of using electrodes which are previously outgassed or substantially so. This effect is apparently expedited by "bombardment" of the tube with heavy currents for the purpose of freeing the glass walls from impurities and persists throughout the use of the tube under normal operating currents.

The invention consists generally in an electrode construction having features of structure and relation pertaining to any one or any combination of the operating characteristics above described.

The volatilization of the electrode is a necessary characteristic of the operation of electroluminescent tubes. In the constructions heretofore used the volatilized metal of the electrode as deposited on the tube walls has progressively occluded the gas with which the tube is filled and to retard and minimize such occlusion the electrode has been made of sufficient size and of such material that its operating temperature is maintained at some relatively low point. The present invention is opposed to known practice in that the volatilization of the electrode is utilized to advantage and the necessity of low temperature operation of the electrode is eliminated.

The metal part of the electrode may have various forms but it is preferably in the form of a hollow cylinder of foraminous construction wherein (the amount of metal for electrical conduction being sufficient for the amount of current to be carried) a fairly even discharge over the whole electrode area is produced with a resultant substantially even or uniform temperature throughout the electrode.

According to the invention the electrode is arranged in a surrounding insulating part which communicates with the interior of the tube and is in such relation to said part that its metal as deposited thereon by vaporization is maintained substantially at or near the operating temperature of the electrode and therefore at a temperature unfavorable to any substantial mechanical occlusion or physical absorption of the gas which is employed as the conducting and illuminating medium. In connection with this arrangement, and as preferred, the relation between the electrode and the surrounding insulating part may moreover be such that the deposited metal of the electrode is maintained in the current path and therefore as a part of the electrode which thus, notwithstanding its vaporization and the consequent deposit of its metal on the insulating part, tends to perpetuate itself.

In the construction disclosed and preferred, but to which, however, the invention is not necessarily limited, the electrode is surrounded and supported by a septum in the form of a cylinder of glass or other suitable material spaced from the tube walls and maintaining the electrode at the approximate axial center of the tube. The electrode is thus insulated thermally by the septum and by an axially disposed volume of gas at low pressure so that the heat produced is confined to the electrode and to the septum and both maintained at a substantially higher temperature than the adjacent portions of the tube. The electrode is preferably in physical contact at one or more points of its extent with the wall of the septum, the ultimate preference being that such physical contact shall be commensurate substantially with the extent of the electrode.

When the proper voltage is applied to the lamp terminals the lamp is filled with a characteristic glow and the electrodes heat up to a temperature at which some degree of surface volatilization or sublimation of the electrode material occurs.

In the constructions heretofore proposed where the electrodes are unprotected the volatilized metal travels directly to the adjacent portions of the lamp where it is cooled and condensed. As it condenses it occludes or traps such gaseous molecules and the gas is thereby removed from the gas space of the lamp.

By the preferred form of my invention the volatilized material is deposited not upon the walls of the lamp tube but upon the walls of the septum by which the electrode is enclosed and where, as preferred, the electrode is in actual physical contact with the septum, the first metal deposited on the septum becomes a part of the electrical circuit and is heated by the current passing over it, further accretions of such metal similarly being included in the circuit. Due to the loss of heat through the wall of the septum the temperature of the septum is always slightly lower than the temperature of the electrode but always higher than the temperature of the adjacent portions of the lamp tube.

Whereas in the constructions heretofore used the occlusion of gas by the volatilized metal deposited upon the lamp tube is favored by the relatively low temperature prevailing at the tube wall, by the present invention the volatilized metal is deposited upon a surface, for example the wall of the septum, at which the temperature is sufficiently high to prevent occlusion of the neon or other inert gas which may be used as the luminescent medium. By having the electrode in substantially uniform physical contact with the septum the metal deposited on the septum and becoming a part of the electrical circuit functions more and more as an electrode as the primary electrode is reduced or impaired. In this way there is obtained the best results in preventing the occlusion of the inert luminescent gas.

It is reasonable to expect that a lamp equipped with electrodes in accordance with my invention will have almost indefinite life and indicative of this fact is a series of life tests run on my electrodes which to date have shown no change or diminution of life after several thousand hours of operation at six times normal amperage. In the meantime unprotected electrodes have been destroyed by the same treatment in much less time than that above mentioned.

It may be pointed out that certain conditions which in the constructions heretofore known have imposed minimum limits upon the size or area of the electrode are not encountered nor involved in the practice of the present invention which, as I have determined by experiments, provides for good results with electrodes of an area sufficiently low to make their use an impossibility for any practical illuminating purpose in the prior constructions. For example, in the constructions heretofore known, premising that the rate of vaporization was a function of the size of the electrode, it has been necessary to employ electrodes of an area such that there is a relatively low rate of vaporization in order to retard the occlusion of the inert luminescent gas by the relatively cold film of metal deposited on the wall of the tube and thereby to retard the consequent exhaustion of the tube; whereas with the present invention the inert gas is not occluded by the deposited metal and hence an increase in the rate of vaporization is permitted which is not practical or possible with the prior constructions. It follows that rules for electrode areas applicable to prior constructions have no necessary parallel application to the present invention, the minimum limits of the electrode areas being dependent on other considerations and being governed principally by the rule that the area must be sufficient to enable the electrode to withstand the operating current. Where the deposited metal is maintained in the current path electrodes of minimum area, extremely small as compared with the electrode areas necessary in the constructions heretofore used, may be employed.

Due to the fact that my electrode opposes or prevents the occlusion of the gas it is practical to use a smaller quantity of the gas, thereby effecting an economy in the production of the tubes and enabling their use with lower operating voltages.

Where, as preferred, the volatilized metal of the electrode is deposited on a septum spaced from the tube walls the electrostatic stresses in the latter are so minimized that there is no liability of the current jumping from one tube to another or to an outlying conductor and hence the liability of the puncturing and resultant destruction of the tube from such cause is eliminated.

An embodiment of the invention is illustrated in the accompanying drawing in which:

Figure 1 is a longitudinal sectional view of the electrode construction in relation to the terminal portion of the lamp tube.

Figure 2 is a cross sectional view of the same on the line 2—2 of Figure 1.

The lamp tube 1 is sufficiently indicated by showing the terminal portion thereof having the re-entrant flare provided with the glass seal 3 through which the lead-in wires 2 pass. The electrode 4 to which the lead-in wires are connected is preferably of copper, of foraminous structure and cylindrical form.

This electrode is preferably arranged within a septum 5 of cylindrical form and preferably of glass the septum 5 having terminal flares 6 by which it is supported and spaced from the tube 1.

To hold the septum against axial displacement of tube 1 may be formed with suitable indentations 7 adjacent the flares 6. To prevent the deposit of the volatilized metal of the electrode upon the walls of the tube 1 the septum 5 is preferably of greater length than the electrode and extends beyond its inner end. The electrode is preferably in physical contact substantially throughout its length with the septum 5. In operation the space within the septum 5 is very much hotter than the space between said septum and the tube 1. Volatilized metal from the electrode 4 is deposited on the inside of the septum 5 and when the electrode is in contact with said septum becomes a part of the circuit of the lamp. The deposition of the metal on the septum 5 takes place at so high a temperature that little or no gas is occluded and the deposited metal under the heat developed by its resistance to the electrical current gives up whatever absorbed gas it may have.

As shown and preferred the electrode is surrounded for its entire length by the septum. It may be pointed out, however, that beneficial results in which the principles of the invention are utilized may be secured even though the electrode should not be wholly surrounded, providing the septum surrounds the active or most of the active surface of the electrode. Hence, where a septum is employed, I do not wish to be limited to a construction in which the electrode is surrounded for its entire length by the septum, even though this be preferred.

Having fully described my invention, I claim:

1. An electroluminescent tube having cold elongated tubular electrodes from the inside surfaces of which the emission takes place and elongated insulating means comprising a conduit which fits over each of said electrodes and which extends beyond the terminal thereof in the direction of the companion electrode, whereby cleanup of the gas by sputtering is prevented, the ends of said conduit being flared for engagement with the tube.

2. An electroluminescent tube having cold elongated tubular electrodes from the inside surfaces of which the emission takes place, one of said electrodes being tubular and having a diameter less than its length and an electrically insulated sheath which fits over each of said electrodes and which extends beyond the terminal thereof in the direction of the companion electrode, whereby cleanup of the gas by sputtering is prevented, the ends of said sheath being flared for engagement with the tube.

CHANNING WHITMAN.